(12) United States Patent
Tuschmann et al.

(10) Patent No.: US 12,471,860 B2
(45) Date of Patent: Nov. 18, 2025

(54) OPERATING CONSOLE OF A MEDICAL DEVICE HAVING INTERFERENCE-SIGNAL IDENTIFICATION

(71) Applicant: Siemens Healthineers AG, Forchheim (DE)

(72) Inventors: Alwin Tuschmann, Heroldsbach (DE); Andre Betz, Schwabach (DE)

(73) Assignee: Siemens Healthineers AG, Forchheim (DE)

( * ) Notice: Subject to any disclaimer, the term of this patent is extended or adjusted under 35 U.S.C. 154(b) by 0 days.

(21) Appl. No.: 18/808,597

(22) Filed: Aug. 19, 2024

(65) Prior Publication Data

US 2025/0064416 A1    Feb. 27, 2025

(30) Foreign Application Priority Data

Aug. 22, 2023  (DE) ..................... 10 2023 208 030.3

(51) Int. Cl.
*A61B 6/46* (2024.01)
*A61B 6/00* (2024.01)
*G01R 31/00* (2006.01)

(52) U.S. Cl.
CPC ................ *A61B 6/467* (2013.01); *A61B 6/54* (2013.01); *G01R 31/001* (2013.01)

(58) Field of Classification Search
CPC .......... A61B 6/467; A61B 6/54; G01R 31/001
See application file for complete search history.

(56) References Cited

U.S. PATENT DOCUMENTS

2002/0070365 A1* 6/2002 Karellas ............... A61B 6/4241
250/581
2003/0088179 A1* 5/2003 Seeley .................. A61B 6/487
600/424

(Continued)

FOREIGN PATENT DOCUMENTS

CN          105615910 A       6/2016
CN          211633325 U      10/2020

(Continued)

OTHER PUBLICATIONS

DE Grant for German Application No. 10 2023 208 030.3 dated Apr. 24, 2024.

(Continued)

*Primary Examiner* — Huy Q Phan
*Assistant Examiner* — Haidong Zhang
(74) *Attorney, Agent, or Firm* — Harness, Dickey & Pierce, P.L.C.

(57) ABSTRACT

An operating console of a medical device has input elements configured to generate electrical control signals as a result of actuation of the input elements by an operator of the medical device. The operating console has an analysis apparatus, which is connected to the input elements to receive the electrical control signals. The analysis apparatus is configured to determine control commands configured to drive the medical device based on the electrical control signals. It has an interface configured to output the control commands to the medical device. The operating console has a number of sensors configured to detect electromagnetic interference signals from the area surrounding the operating console. The analysis apparatus is connected to the sensors to receive characteristic quantities for the electromagnetic interference signals detected by the sensors. It is configured to process the characteristic quantities.

14 Claims, 4 Drawing Sheets

(56) References Cited

U.S. PATENT DOCUMENTS

2016/0143610 A1 5/2016 Luthardt et al.
2019/0343421 A1* 11/2019 Yanof .................... A61B 5/746
2021/0228176 A1* 7/2021 Vandroux ...... H03K 19/017581
2021/0367631 A1 11/2021 Huebl et al.

FOREIGN PATENT DOCUMENTS

CN 112236332 A 1/2021
DE 102005031785 A1 1/2007

OTHER PUBLICATIONS

Zhao Xiaoxia, "Research on interference signal control algorithm of ship anti-pollution electrical control platform", Ship Science and Technology, Nummer 14, doi : 10.3404/j.issn.1672-7649.2020.7A.073, Jul. 23, 2020.

* cited by examiner

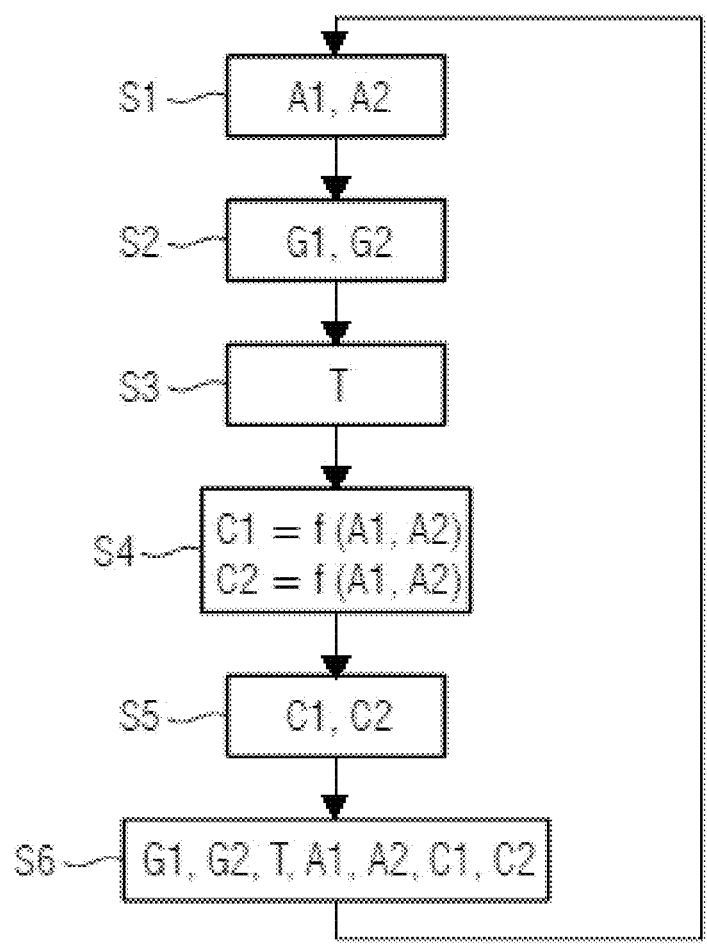

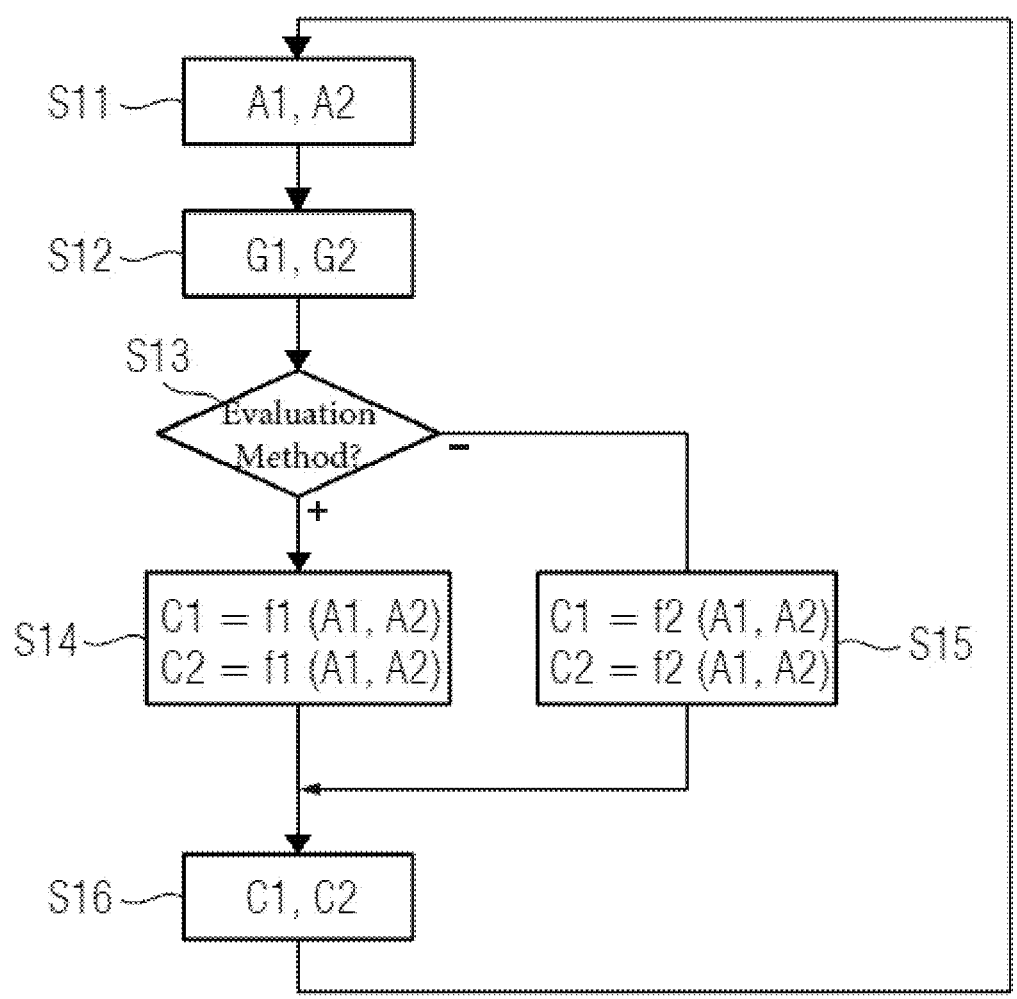

OPERATING CONSOLE OF A MEDICAL DEVICE HAVING INTERFERENCE-SIGNAL IDENTIFICATION

CROSS-REFERENCE TO RELATED APPLICATION(S)

The present application claims priority under 35 U.S.C. § 119 to German Patent Application No. 10 2023 208 030.3, filed Aug. 22, 2023, the entire contents of which is incorporated herein by reference.

FIELD

The present invention is based on an operating console of a medical device.

RELATED ART

A medical device can be a patient table, for example, which performs a translational and/or rotational movement via a motor. In this case, the relevant control commands can be generated and transferred to drives of the patient table directly or via an interposed control apparatus via the operating console. Alternatively, the medical device can be an X-ray system, for example, in particular a C-arm system. In this case, the relevant control commands, which are used to move the X-ray system and to control the acquisition of X-ray images per se, can be generated via the operating console.

For example, the input elements can be pushbuttons, switches, joystick-like control levers and more besides.

The analysis apparatus typically has internally a microprocessor, which defines the way in which the analysis apparatus works. Thus in particular the programming of the analysis apparatus defines the manner in which the analysis apparatus determines the control commands on the basis of the electrical control signals.

The interface for outputting the control commands can be in the form of a bus interface or a proprietary interface, according to need.

Medical devices and the associated operating consoles may be exposed to sources of electromagnetic interference. An example of such an interference source is what is known as an electrosurgical knife. Electrosurgical knives are used to selectively cauterize and/or cut human tissue via electric current. Such electrosurgical knives are operated at frequencies in the range between 100 kHz and several MHz, using voltages of up to several kV and powers of several 100 W. It can easily happen that the accompanying cables are routed—unintentionally or on purpose—over an operating console of a medical device, or an electrosurgical knife itself is put down there during a period when it is not in use. The physical proximity of the cable or the electrosurgical knife to the operating console can cause interference in the operating console. A further possible interference source are devices from the cellular communications sector, for instance cellular phones. Such devices can also cause interference in the operating console.

Attempts are made in the prior art to avoid such interference. This is done partly by using circuits that have interference immunity, through hardware filters, shielding foils and other hardware measures. Partly this is done by analog or digital filtering of the electrical control signals. In both cases, however, it can happen that the analysis apparatus does not respond, or responds only to a lesser extent and/or with a delay, to electrical control signals generated by the input elements. In addition, the expenditure to achieve the required interference immunity is high.

SUMMARY

One or more example embodiments provides ways in which the effect of electromagnetic interference signals from the area surrounding the operating console can be detected and made use of in a simple manner.

The is achieved by an operating console having the features of claim 1. The subject matter of dependent claims 2 to 8 contains advantageous embodiments of the operating console.

BRIEF DESCRIPTION OF THE DRAWINGS

The following description of the exemplary embodiments, which are explained in greater detail in connection with the drawings, will clarify and elucidate the above-described properties, features and advantages, and the manner in which they are achieved, in which drawings, in a schematic representation:

FIG. 4 shows a flow diagram according to one or more example embodiments; and FIG. 5 shows a further flow diagram according to one or more example embodiments.

DETAILED DESCRIPTION

Figure 1:
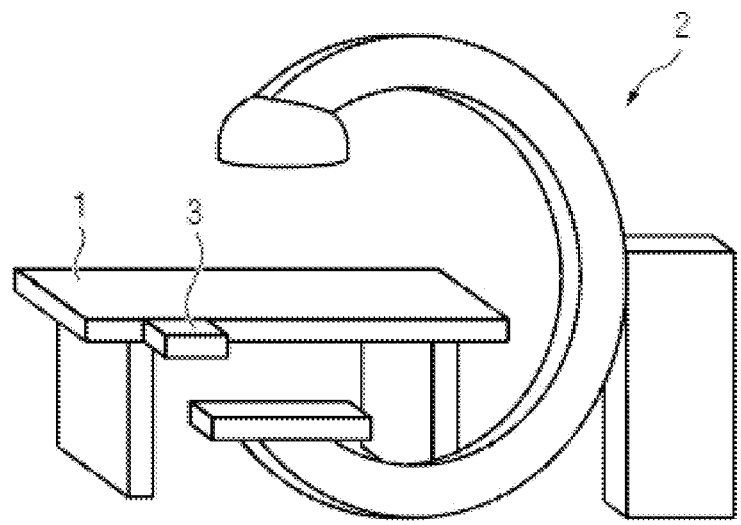
FIG. 1 shows a medical device according to one or more example embodiments.

According to one or more example embodiments, an operating console of the type mentioned in the introduction is embodied such that the operating console has a number of sensors for detecting electromagnetic interference signals from the area surrounding the operating console, such that the analysis apparatus is connected to the sensors for the purpose of receiving characteristic quantities for the electromagnetic interference signals detected by the sensors, and such that the analysis apparatus is designed to process the characteristic quantities.

The number of sensors can be according to need. A single sensor is present as a minimum. Often a plurality of sensors are present. For example, one of the sensors can be used to detect an electric field, and another of the sensors to detect a magnetic field. The sensors can also be designed to detect interference signals arising in different frequency ranges. In addition, sensors of the same type can be arranged at different positions on the operating console. The stated measures can also be combined with one another.

As already mentioned, the analysis apparatus typically has internally a microprocessor, which defines the way in which the analysis apparatus works. Thus in particular the programming of the analysis apparatus defines the manner in which the analysis apparatus processes the characteristic quantities.

The analysis apparatus is preferably designed to store the characteristic quantities together with respective timestamps in the sense of a history.

Just storing the characteristic quantities and the associated timestamps (i.e. without storing further quantities) offers a significant advantage. This is because users of the operating console or of the medical device can often report that the operating console or the medical device has malfunctioned, and more or less when. Although the users cannot state the cause of the malfunctioning, by analyzing the stored history it is possible nonetheless to establish, or at least presume, at least in some cases, that the cause thereof is the presence of electromagnetic interference signals, or conversely, based on the absence of electromagnetic signals, to rule out that electromagnetic interference signals are the cause of the malfunctioning.

The analysis apparatus is preferably designed to store together with the characteristic quantities and the timestamps also the electrical control signals and/or the control commands.

The storing also of the electrical control signals and/or the control commands often makes troubleshooting easier. In particular, it can be determined at what times the actually determined control commands have certain values. It is thereby possible to ascertain more precisely in particular time periods during which, according to the users of the operating console or of the medical device, the operating console or the medical device has malfunctioned.

The analysis apparatus is preferably designed to take into account in determining the control commands also the characteristic quantities in addition to the electrical control signals.

For example, in the case in which the electromagnetic interference signals are not present, or only have a low signal level, the analysis apparatus can use a first (for example relatively sensitive) determination algorithm to determine the control commands from the electrical control signals, and in the case in which the electromagnetic interference signals are present and have a relatively high signal level, can use a second (for example relatively robust) determination algorithm to determine the control commands.

Hence on the one hand, in cases in which the electromagnetic interference signals are not present, or only have a low signal level, it is possible to respond sensitively to the operation of the input elements by the user, and on the other hand, in cases in which the electromagnetic interference signals are present and have a relatively high signal level, it is possible to avoid erroneous responses that might be caused by the electromagnetic interference signals in the case of a sensitive response.

At least one of the sensors is preferably arranged inside a volume enclosed by a housing of the operating console. This allows the sensor concerned to be arranged in particular close to components that are sensitive to electromagnetic interference signals.

For example, the sensor concerned can be arranged on a printed circuit board arranged in the enclosed volume. This simplifies the routing of lines from the sensor concerned to the analysis apparatus.

At least one of the sensors is preferably arranged in a bounding element of the operating console facing the area surrounding the operating console. This allows the sensor concerned to be arranged in that region at which an electromagnetic interference source is expected to have the greatest influence. This applies especially when the bounding element is arranged on the top face of the operating console.

Independent of the grammatical term usage, individuals with male, female or other gender identities are included within the term.

Corresponding to the representation in FIG. 1, a medical device 1, 2 can be in the form of a patient table 1, for example. Alternatively or additionally, the medical device 1, 2 can be in the form of a medical imaging system 2, for example in the form of a C-arm system, as shown, or an ultrasound system.

Irrespective of the specific embodiment of the medical device 1, 2, the medical device 1, 2 is assigned an operating console 3. The operating console 3 can be fixedly mounted, for example, at the patient table 1 or in its immediate vicinity. The operating console 3 is used to control the medical device 1, 2.

Figure 2:
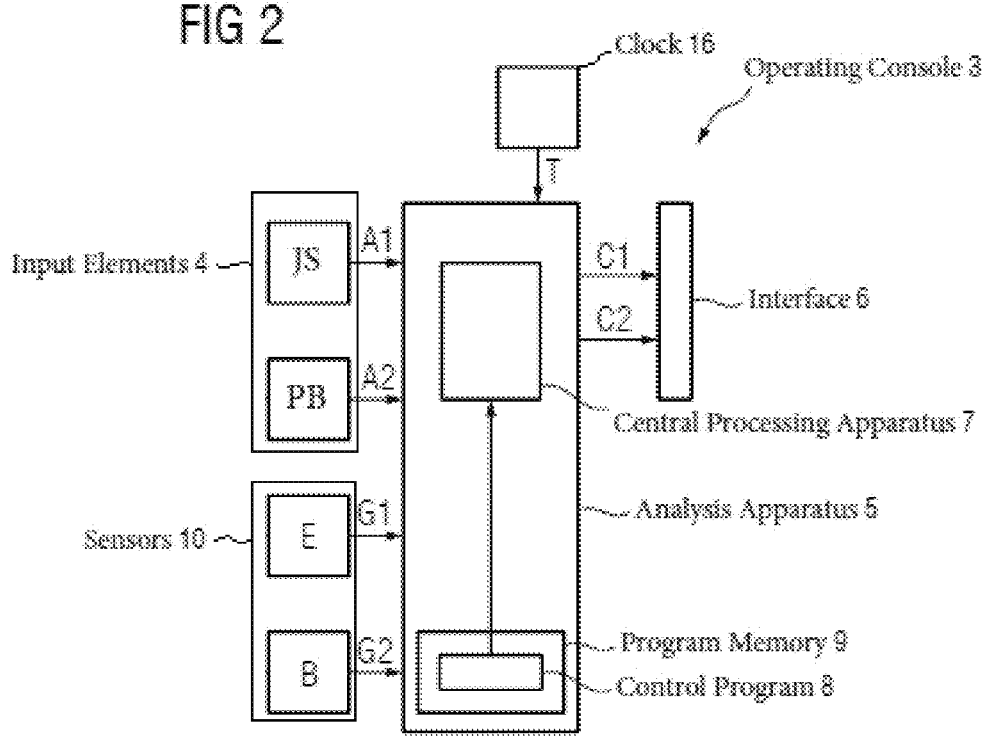
FIG. 2 shows a block diagram of an operating console according to one or more example embodiments.
Figure 3:
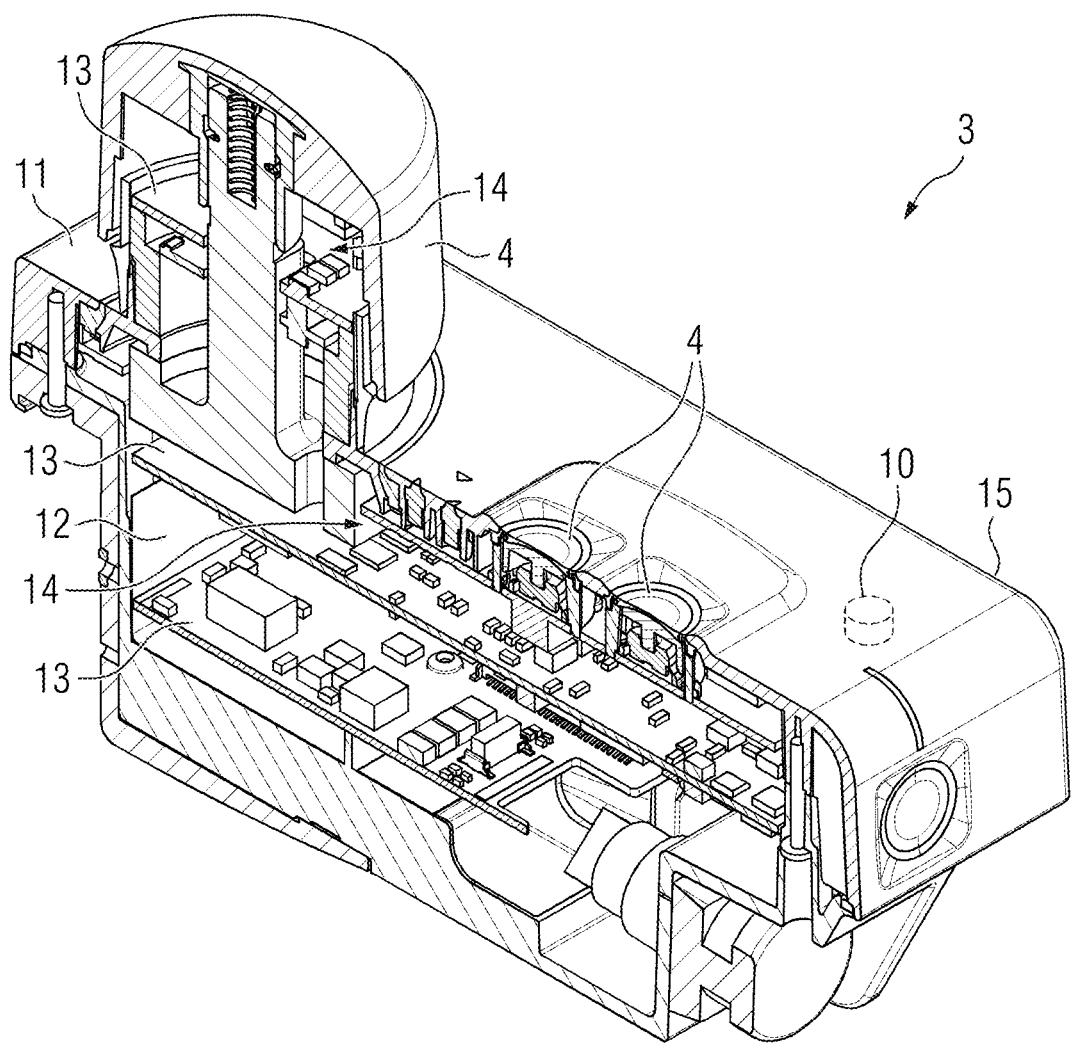
FIG. 3 shows a section through a perspective view of an operating console according to one or more example embodiments.

As shown in FIG. 2 and FIG. 3, the operating console 3 has input elements 4. An operator of the medical device 1, 2 (the operator, for instance a doctor, is not depicted) can actuate the input elements 4. As a result of the operator actuating the input elements 4, the input elements 4 generate electrical control signals A1, A2 etc. The generating of the electrical control signals A1, A2 etc. can be brought about by mechanical actuation of electrical contacts, and thereby opening or closing of circuits, as a result of the actuating of the corresponding input elements 4. Purely by way of example, FIG. 3 shows as input elements 4 a joystick-like operating lever (JS) and two pushbuttons (PBs). The input elements 4 could also differ in number, combination and type of design, however. For example, it is possible to identify the presence of a finger of the operator not by closing or opening of contacts but capacitively or by other contactless means.

The operating console 3 also has an analysis apparatus 5. The analysis apparatus 5 is connected to the input elements 4. The analysis apparatus 5 is thereby capable of receiving from the input elements 4 their generated electrical control signals A1, A2 etc.

The analysis apparatus 5 receives from the input elements 4 the electrical control signals A1, A2 etc., which it analyzes. In particular, the analysis apparatus 5 determines control commands C1, C2 etc. on the basis of the electrical control signals A1, A2. The control commands C1, C2 etc. are used to drive the medical device 1, 2. For example, the patient table 1 can be positioned on the basis of the control commands C1, C2 etc. The same applies to the medical imaging system 2. The analysis apparatus 5 has an interface 6 for the purpose of outputting the control commands C1, C2 to the medical device 1, 2.

The analysis apparatus 5 usually has a microprocessor as the central processing apparatus 7, or what could be called the "brain". The microprocessor is programmed with a control program 8, which is held in a program memory 9 of the analysis apparatus 5. The programming of the microprocessor and execution of the control program 8, respectively, define the way in which the analysis apparatus 5 works.

The operating console 3 also has a number of sensors 10. Via the sensors 10, it is possible to detect electromagnetic interference signals E, B from the area surrounding the operating console 3. The number of sensors 10 can be according to need. For example, corresponding to the representation in FIG. 2, the operating console 3 can have one sensor 10 for detecting an electrical interference signal E and one sensor 10 for detecting a magnetic interference signal B. For detecting an electrical interference signal E, the relevant sensor 10 can have, for example, an antenna and an electroscope circuit arranged thereafter. Suitable antennas are known to persons skilled in the art. Examples are wire antennas, chip antennas and PCB antennas. In particular, Hall sensors can be used to detect a magnetic interference signal B. The sensors 10 generate, on the basis of the electromagnetic interference signals E, B that they detect, characteristic quantities G1, G2 therefor.

The sensors 10 can be arranged according to need. For example, corresponding to the representation in FIG. 3, the operating console 3 usually has a housing 11, which encloses a volume 12. At least one of the sensors 10 can be arranged inside the volume 12. In particular, larger and smaller printed circuit boards 13 are usually arranged inside the volume 12. The sensor 10 concerned can be arranged, for example, on such a printed circuit board 13, for instance the printed circuit board of a joystick-like operating lever. This is indicated by corresponding arrows 14 in FIG. 3. Alternatively or additionally, corresponding to the dashed representation of a sensor 10 in FIG. 3, it is possible to arrange at least one of the sensors 10 in a bounding element 15 of the operating console 3. In this case, the bounding element 15 concerned faces the area surrounding the operating console 3. It therefore forms a constituent part of the external face of the operating console 3. Corresponding to the representation in FIG. 3, the bounding element 15 can be arranged in particular on the top face of the operating console 3. If parts of the housing of the operating console 3 are made of metal, the relevant part of the housing can also be used as an antenna for a sensor 10 for the purpose of detecting an electrical interference signal E.

The determining of the characteristic quantities G1, G2 etc. can be performed as required. For example, a pure threshold-value analysis can be performed. Alternatively or additionally, filtering and/or averaging can be carried out. Other analyses are also possible. It is even possible that without prior effect, characteristic quantities G1, G2 etc. corresponding to the direct electromagnetic interference signals E, B are determined and output. The analyses can be designed to be simple and inexpensive, since it is merely necessary to identify the exceeding of a threshold value, if applicable even just within a predefined frequency range.

The analysis apparatus 5 is connected to the sensors 10. In particular, the analysis apparatus 5 receives from the sensors 10 the characteristic quantities G1, G2 generated by the sensors 10. The characteristic quantities G1, G2 are processed by the analysis apparatus 5. The relevant processing is performed by the processing apparatus 7. The control program 8 usually defines the manner of the processing.

A possible manner in which the characteristic quantities G1, G2 etc. are processed by the analysis apparatus 5 is explained below in connection with FIG. 4.

According to FIG. 4, in a step S1, the analysis apparatus 5 receives from the input elements 4 their control signals A1, A2 etc. In addition, in a step S2, the analysis apparatus 5 receives from the sensors 10 the characteristic quantities G1, G2 etc. Finally, in a step S3, the analysis apparatus 5 receives the current time T. For example, as shown in FIG. 2, the current time T can be provided to the analysis apparatus 5 by a clock 16 (timer 16) of the operating console 3.

In a step S4, the analysis apparatus 5 determines the control commands C1, C2 etc. on the basis of the electrical control signals A1, A2. This determining is performed as in the prior art. In a step S5, the analysis apparatus 5 outputs the determined control commands C1, C2 etc. to the medical device 1, 2 via the interface 6.

In a step S6, the analysis apparatus 5 stores the characteristic quantities G1, G2 etc. together with an associated timestamp, i.e. ultimately the current time T provided in step S3 by the timer 16. The storing in step S6 is performed in the sense of a history. The storing thus does not displace already stored characteristic quantities G1, G2 etc. and the associated timestamps, but occurs in addition ("the history gets ever longer").

Preferably, the storing of the electrical control signals A1, A2 etc. and/or of the control commands C1, C2 etc. additionally also takes place in step S6.

From step S6, the analysis apparatus 5 returns to step S1 again. Therefore the analysis apparatus 5 repeatedly executes steps S1 to S6 in an iterative manner.

A further possible manner in which the characteristic quantities G1, G2 etc. are processed by the analysis apparatus 5 is now explained below in connection with FIG. 5. It also becomes evident from the following explanation of the procedure in FIG. 5 that the procedure in FIG. 5 can be combined with that of FIG. 4 if required.

The procedure of FIG. 5 first contains steps S11 and S12. Steps S11 and S12 correspond 1:1 with steps S1 and S2 of FIG. 4. Thus with regard to steps S11 and S12, reference is made to the above statements relating to steps S1 and S2 of FIG. 4.

On account of the possibility of combining the procedure of FIG. 5 with that of FIG. 4, it is also possible that a step corresponding to step S3 is also present. This is not shown in FIG. 5, however, because the corresponding step does not have to be present.

Step S4 of FIG. 4 is substituted by steps S13 to S15 according to FIG. 5. In step S13, the analysis apparatus 5 analyzes the characteristic quantities G1, G2 etc., and decides as a result of this evaluation the manner in which it determines the control commands C1, C2 etc. on the basis of the electrical control signals A1, A2. For example, the analysis apparatus 5 can check in step S13 whether the characteristic quantities G1, G2 etc. exceed predefined threshold values or, in general terms, satisfy certain conditions. Depending on the result of the check, the analysis apparatus 5 can move on either to step S14 or to step S15, for example.

Both in step S14 and in step S15, the analysis apparatus 5 determines the control commands C1, C2 etc. on the basis of the electrical control signals A1, A2 etc. The manner of the determining in step S14 differs from the manner of the determining in step S15, however. It can therefore happen that, despite identical electrical control signals A1, A2 etc., for example the control command C1 has a first value in step S14 and a second value in step S15, wherein the second value differs from the first value. For example, a time length, during which one of the control signals A1, A2 must have a constant value in order to generate a corresponding control command C1, C2, can be specified according to the characteristic quantities G1, G2. Regardless of the actual procedure, however, the analysis apparatus 5 thereby ultimately takes into account in determining the control commands C1, C2 etc. also the characteristic quantities G1, G2 etc. in addition to the electrical control signals A1, A2 etc.

After the steps S13 and S14, or S13 and S15, the analysis apparatus 5 executes a step S16. Step S16 of FIG. 5 corresponds 1:1 with step S5 of FIG. 4. Thus with regard to step S16, reference is made to the above statements relating to step S5 of FIG. 4.

From step S16, the analysis apparatus 5 returns to step S11 again. Therefore the analysis apparatus 5 repeatedly executes steps S11 to S16 in an iterative manner.

On account of the possibility of combining the procedure of FIG. 5 with that of FIG. 4, it is also possible that a step corresponding to step S6 of FIG. 4 is also present. This is not shown in FIG. 5, however, because a step corresponding to step S6 does not have to be present. If the step were present, this step would be executed between the execution of step S16 and the return to step S11.

In summary, the present invention thus relates to the following substantive matter:

An operating console 3 of a medical device 1, 2 has input elements 4 for generating electrical control signals A1, A2 as a result of actuation of the input elements 4 by an operator of the medical device 1, 2. The operating console 3 has an analysis apparatus 5, which is connected to the input elements 4 for the purpose of receiving the electrical control signals A1, A2. The analysis apparatus 5 is designed to determine control commands C1, C2 for driving the medical device 1, 2 on the basis of the electrical control signals A1, A2. It has an interface 6 for outputting the control commands C1, C2 to the medical device 1, 2. The operating console 3 has a number of sensors 10 for detecting electromagnetic interference signals E, B from the area surrounding the operating console 3. The analysis apparatus 5 is connected to the sensors 10 for the purpose of receiving characteristic quantities G1, G2 for the electromagnetic interference signals E, B detected by the sensors 10. It is designed to process the characteristic quantities G1, G2.

The present invention has many advantages. In particular, by making use of not just the electrical control signals A1, A2 but also the characteristic quantities G1, G2, an improved analysis of the electrical control signals A1, A2 is possible. At the very least, however, the determining of a history of the characteristic quantities G1, G2 etc. is possible.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc.

As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Although the invention has been illustrated and described in detail using the preferred exemplary embodiment, the invention is not limited by the disclosed examples, and a person skilled in the art can derive other variations therefrom without departing from the scope of protection of the invention.

The invention claimed is:

1. An operating console of a medical device, the operating console comprising:
input elements configured to generate electrical control signals as a result of actuation of the input elements by an operator of the medical device;
an analysis apparatus connected to the input elements, the analysis apparatus being configured to,
receive the electrical control signals, and
determine control commands for driving the medical device based on the electrical control signals;
an interface configured to output the control commands to the medical device; and
a number of sensors configured to detect electromagnetic interference signals from an area surrounding the operating console, wherein
the analysis apparatus is connected to the sensors and configured to receive characteristic quantities of the electromagnetic interference signals detected by the number of sensors, and
the analysis apparatus is configured to process the characteristic quantities,
the analysis apparatus is configured to determine the control commands based on the characteristic quantities and the electrical control signals,
the characteristic quantities include a signal level of the electromagnetic interference signals,
the analysis apparatus is configured to determine the control commands based on the electrical control signals using a first algorithm in response to the signal level of the electromagnetic interference signals exceeding a threshold, and
the analysis apparatus is configured to determine the control commands based on the electrical control signals using a second algorithm in response to the signal level of the electromagnetic interference signals being less than or equal to the threshold, the second algorithm being different from the first algorithm.

2. The operating console of claim 1, wherein the analysis apparatus is configured to store the characteristic quantities together with associated timestamps.

3. The operating console of claim 2, wherein the analysis apparatus configured to store together the characteristic quantities, the associated timestamps and at least one of the electrical control signals or the control commands.

4. The operating console of claim 1, wherein at least a first sensor among the number of sensors is arranged inside a volume enclosed by a housing of the operating console.

5. The operating console of claim 4, wherein the first sensor is on a printed circuit board in the enclosed volume.

6. The operating console of claim 1, wherein at least one among the number of sensors is in a bounding element of the operating console facing the area surrounding the operating console.

7. The operating console of claim 6, wherein the bounding element is on a top face of the operating console.

8. The operating console of claim 1, wherein at least a first sensor among the number of sensors is arranged inside a volume enclosed by a housing of the operating console, a part of the housing being metal.

9. The operating console of claim 8, wherein the first sensor is configured to detect an electric field.

10. The operating console of claim 1, wherein the number of sensors includes:
a first sensor configured to detect an electric field; and
a second sensor configured to detect a magnetic field.

11. The operating console of claim 1, wherein the number of sensors are configured to detect the electromagnetic interference signals in different frequency ranges.

12. The operating console of claim 1, wherein the number of sensors includes only a single sensor.

13. The operating console of claim 1, wherein the interface is configured to output the control commands to drives of the medical device.

14. The operating console of claim 1, wherein the interface is a bus interface.

\* \* \* \* \*